United States Patent [19]

Hoke

[11] Patent Number: 5,080,302

[45] Date of Patent: Jan. 14, 1992

[54] METHOD AND APPARATUS FOR AERIALLY TRANSPORTING LOADS

[76] Inventor: Sherman D. Hoke, 3959 Hwy. 238, Jacksonville, Oreg. 97530

[21] Appl. No.: 577,780

[22] Filed: Sep. 5, 1990

[51] Int. Cl.$^5$ .............................................. B64B 1/50
[52] U.S. Cl. ...................................... 244/31; 244/33; 212/71
[58] Field of Search ............... 244/31, 33, 36; 212/71, 212/76, 87, 97

[56] References Cited

U.S. PATENT DOCUMENTS

| | | | |
|---|---|---|---|
| 803,573 | 11/1905 | Eubank, Jr. | 244/33 |
| 3,005,604 | 10/1961 | McDonald | 244/33 |
| 3,045,952 | 7/1962 | Underwood | 244/33 |
| 3,249,237 | 5/1966 | Stewart | 212/71 |
| 3,270,895 | 9/1966 | Stewart | 244/33 |
| 3,448,864 | 6/1969 | Fenn et al. | 244/33 |
| 3,807,577 | 4/1974 | Bell | 212/71 |
| 3,865,251 | 2/1975 | Langford | 244/33 |
| 4,055,316 | 10/1977 | Chipper et al. | 244/33 |
| 4,640,474 | 2/1987 | Manseth | 244/33 |
| 4,687,109 | 8/1987 | Davis | 212/76 |

FOREIGN PATENT DOCUMENTS

| | | | |
|---|---|---|---|
| 3502037 | 7/1986 | Fed. Rep. of Germany | 244/33 |
| 0685622 | 9/1979 | U.S.S.R. | 244/31 |

OTHER PUBLICATIONS

"Aerostat History", Chapter 1 and Description of Aerostat Systems, chapter 2 of GE Government Services publication *Southwest Tethered Aerostat System—Description and Operations Overview*, no date.

Schematic illustration of Nick Wall Hybrid Lifter, no date.

Schematic illustration of Sky-Cam System, no date.

Schematic illustration of U.S. Navy "Deep Sea Recovery Vehicle or System", no date.

"Balloon Logging—from 'Blue Sky' to Commercial Use" by Louis H. Blackerby, published in *Pulp and Paper*, Oct. 3, 1966.

"Logging Test of a Single-Hull Balloon" by Hilton H. Lysons, Virgil W. Binkley, and Charles N. Mann, *U.S. Forest Service Research Paper PNW-30*, published in Sep. 1966, by the Pacific Northwest Forest and Range Experiment Station.

"An Operational Test of a Natural-Shaped Logging Balloon" by Virgil W. Binkley and Ward W. Carson, *U.S. Forst Service Research Note PNW-87*, published in Sep. 1968, by the Pacific Northwest Forest and Range Experiment Station.

(List continued on next page.)

Primary Examiner—Joseph F. Peters, Jr.
Assistant Examiner—Linda L. Palomar
Attorney, Agent, or Firm—Klarquist, Sparkman, Campbell, Leigh & Whinston

[57] ABSTRACT

The present invention is a balloon system for transporting a load wherein an aerostat is movable, both horizontally and vertically, throughout a working area defined by the guy lines that anchor the aerostat. Such area can include multiple pickup and discharge points. The balloon system is especially useful for logging in inaccessible or rugged terrain and transporting heavy loads between widely separated pickup and discharge points with intervening obstructions rendering group transport difficult. Individual loads may be picked up at any point within the working area for movement to a discharge point for unloading, after which conventional load handling equipment may be used to handle the load. A plurality of at least three guy lines radiating downwardly from the aerostat anchors the balloon to individual and separately controllable ground-based guy line control and storage apparatus. Each control apparatus is controllable to extend or retract its respective guy line. This allows complete range of movement of the aerostat and its suspended load anywhere within the work area from a pickup point to a discharge point. This control makes load handling possible in work areas which would be difficult and expensive to access using conventional load-handling equipment.

34 Claims, 7 Drawing Sheets

"Aerial Log Hauling: The Shape of Things to Come" by the Editor, published in *The Log*, vol. 6, No. 6, p. 9, Nov. 1982.

"Cyclo-Crane is Coming" by Bob Schaffer, published in *The Log*, vol. 6, No. 6, Nov. 1982, pp. 10–12.

"An Heli-Stat is Coming Too" by Bob Schaffer published in *The Log*, vol. 6, No. 6, Nov. 1982, pp. 14–15.

"Forest Service to Test and Evaluate Heli-Stat and Cyclo—Crane" author unknown, published in *The Log*, vol. 6, No. 6, Nov. 1982, pp. 16 and 17.

"The Flying Scottsman Skids—EM by Air" by Bob Schaffer, published in *The Log*, vol. 6, No. 6, Nov. 1982, pp. 18 and 19.

"Pendulum Swing Concept for Balloon Logging Studied at OSU" by Bob Schaffer, published in *The Log*, vol. 6, No. 6, Nov. 1982, pp. 20–21.

METHOD AND APPARATUS FOR AERIALLY TRANSPORTING LOADS

TECHNICAL FIELD

This invention relates to aerially transporting loads between sites and, more particularly, to the transporting of such loads by suspending the loads beneath a tethered aerostat and controlling the tethers to selectively move the aerostat and the supported loads.

BACKGROUND ART

It has long been recognized that the use of lighter-than-air balloons or other aerostats for transporting loads such as logs in inaccessible or rugged areas would be extremely beneficial. Several attempts have been made to develop efficient balloon systems for transporting loads.

Stewart, U.S. Pat. No. 3,270,895, for instance, discloses a balloon yarding system which uses a combination of static lift and aerodynamic lift to move logs from a pickup site to a discharge site. The attitude of the balloon is controlled to increase or decrease the aerodynamic lift to assist the static lift of the balloon. A conventional yarder retracts or extends a main line and a haul-back line to move the balloon in a straight line.

Fenn. et al., U.S. Pat. 3,448,864, discloses a two-line balloon logging system wherein the main line is controlled by a first winch and the haul-back line is controlled by a second winch. A lift line, when lowered, adjusts the angle of attack of a balloon to increase the lift capacity. The angle of attack of the balloon is controlled by the amount of load applied to the balloon.

Langford, U.S. Pat. No. 3,865,251, discloses a balloon yarding system for transporting logs in a straight line which utilizes a single continuous cable for out haul, in haul, and altitude of the balloon. Selective extension or retraction of the cable causes the balloon to traverse a straight line and to vary in altitude.

Chipper, et al., U.S. Pat. No. 4,055,316, recognizes the problem of keeping balloon control lines above and away from any obstacles which could snag the lines. A lifting balloon is provided for lifting a load. A pair of winches is provided, one on each end of a control cable, for moving the lifting balloon from a loading site to a discharge site. A plurality of auxiliary balloons are provided to keep the cables above any obstacles.

Each of the above attempts at balloon yarding was adequate for its intended purposes but several limitations and problems still exist. The above systems could only operate in a straight line within a limited area. To change the area or path of coverage, either a winch or turning blocks for a yarder, needed to be relocated. This is extremely difficult in rugged terrain.

A need, therefore, exists for a balloon transportation and yarding system which can cover a wide area without the need of relocating essential components. A need also exists to insure that all control and attachment lines are always clear of any obstacles on the terrain. A further need exists for an efficient control of the balloon within its area of travel. Finally, a need exists for a balloon transportation system that fulfills the foregoing needs simply and safely.

SUMMARY OF THE INVENTION

A broad object of the invention is to provide a method and apparatus that fulfill the foregoing needs.

A more specific object of the invention is to provide a method and apparatus to move high tonnage loads over short to intermediate distances by supporting the loads from an aerostat which is controllable in a vertical and multiple horizontal directions.

It is another object of the invention to provide a system and method for transporting load, such as logs, between multiple spaced apart ground locations at high speed using a high lift, lighter-than-air aerostat to suspend the load above the ground.

Still another object of the invention is to provide a control method and mechanism for selectively retracting and extending guy lines to move the aerostat and its supported load vertically and in multiple horizontal directions between various ground loading and unloading positions.

It is another object, therefore, to provide a log yarding mechanism which can transport logs out of areas inaccessible to conventional yarding equipment.

Another object is to provide a method and apparatus as aforesaid which can be performed and operated easily and safely in a wide range of wind and weather conditions.

The present invention utilizes an aerostat or lighter-than-air balloon for lifting loads from a pickup site to a discharge site. The aerostat has support lines which terminate at a common suspended support platform. A plurality of guy lines, being at least three, but in a preferred embodiment, four, radiate downwardly from the platform toward the ground. The ground end of each guy line is connected to a guy line control apparatus which can selectively extend or retract its connected guy line independently or in conjunction with the other guy lines. A tension measuring device is incorporated in each guy line control apparatus to insure that tension is applied to the guy line at all times to prevent the guy line from going slack and touching the ground or other obstacles.

An operator control console controls the operation of each guy line control apparatus to selectively retract or extend each guy line to move the aerostat about its total vertical and horizontal range of travel. Control of each guy line controls aerostat movement vertically as well as horizontally.

A lift line extends beneath the platform for engaging a load at a pickup site. The aerostat is then moved to a discharge site and the load is lowered for removal from the lift line.

Other features, objects, and advantages of the present invention will be apparent from the following description of a preferred embodiment thereof and from the accompanying drawings.

DETAILED DESCRIPTION OF A PREFERRED EMBODIMENT

Figure 1:
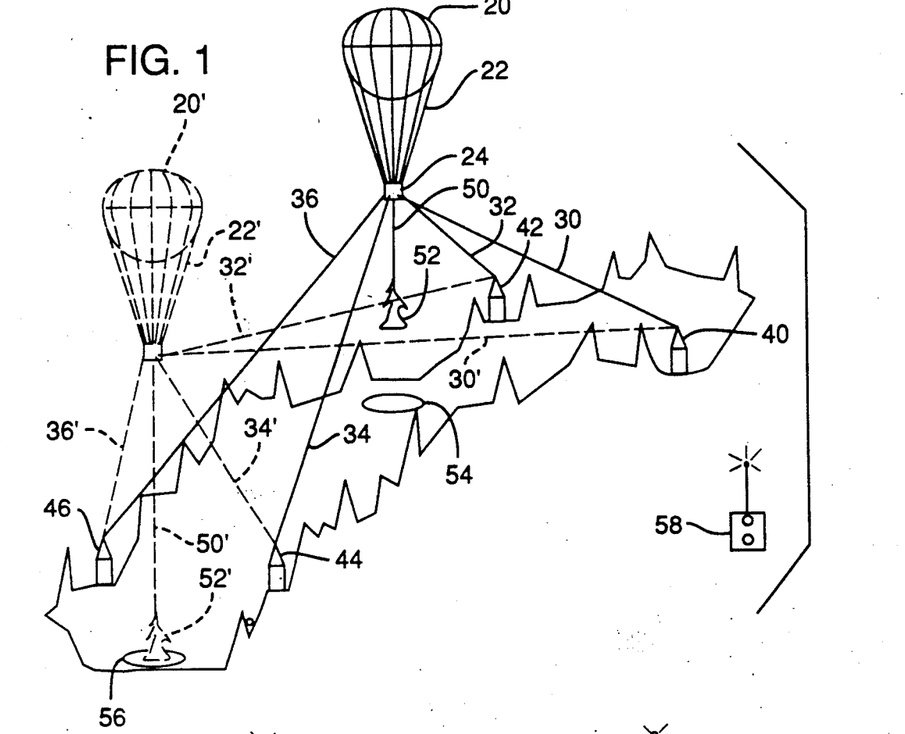
FIG. 1 is an isometric view of the aerial transporting apparatus of the present invention.

Referring to FIG. 1, the apparatus for aerially transporting loads can be used for transporting high tonnage loads from multiple loading sites to multiple discharge sites over rugged, inaccessible, obstruction-filled or rough terrain. For example, the method and system could be used to transport equipment and materials from a supply point to a construction site in a congested city environment. In the illustrated embodiment of the invention, the aerial transport system is used for yarding logs in remote and mountainous terrain. Typically, the apparatus can pick up logs from inaccessible areas and transport them to a discharge area which is accessible by conventional yarding equipment.

An aerostat 20 has a plurality of support lines 22 attached to the aerostat 20 and extending downwardly to a common attachment or support platform 24. Each of the support lines 22 has a first end attached to the aerostat 20 and a second end attached to the support platform 24. A plurality of guy lines or tethers, at least three but in the embodiment shown in FIG. 1 being four, guy lines 30, 32, 34, and 36 are attached to the support platform 24 and extend downwardly, each to a guy line control apparatus 40, 42, 44, and 46. A first end of each guy line 30, 32, 34, and 36 attaches to support platform 24 while a second end of each guy line 30, 32, 34, and 36 is connects to a respective guy line control apparatus 40, 42, 44, or 46. Each guy line control apparatus 40, 42, 44, and 46 is firmly attached and anchored to the ground. In a preferred embodiment, the guy lines 30, 32, 34, and 36 are high strength, light-weight cables of Kevlar ® or Spectra ® fibers. These materials insure flexibility, light weight, high strength, and abrasion resistance. There is one guy line control apparatus for each guy line. For instance, guy line control apparatus 40 controls guy line 30, guy line control apparatus 42 controls guy line 32, guy line control apparatus 44 controls guy line 34, and guy line control apparatus 46 controls guy line 36. Each guy line control apparatus can extend or retract its respective guy line to move the aerostat 20 horizontally or vertically over its limit of travel.

A lift line 50 extends from the support platform 24. In one embodiment lift line 50 has a fixed length and is attached directly to support platform 24 while in an alternative embodiment lift line 50 is extensible and retractable from the support platform or from an auxiliary equipment platform, as explained below. In either case, the lift line 50 engages a load 52 from, for instance, a loading site 54. Each guy line control apparatus then extends or retracts its respective guy line under control of an operator control console 58 to move the aerostat over a discharge site 56 in a desired horizontal direction and at a desired altitude. The aerostat 20' is moved by selective retraction or extension of the respective guy lines 30', 32', 34', and 36'. The lift line 50' is then extended to place the load 52' into the landing area or discharge area 56. In the alternative embodiment of the invention having a fixed length, lift line 50, the aerostat 20' is lowered by selective and controlled retraction of the guy lines 30', 32', 34' and 36' to lower the load 52' to the discharge area 56. The lift line 50' is then removed from the load 52' and the aerostat 20' is moved back over the loading area 54 in a desired direction and at a desired altitude for attachment to a new load at the same or a different loading site.

Figure 2:
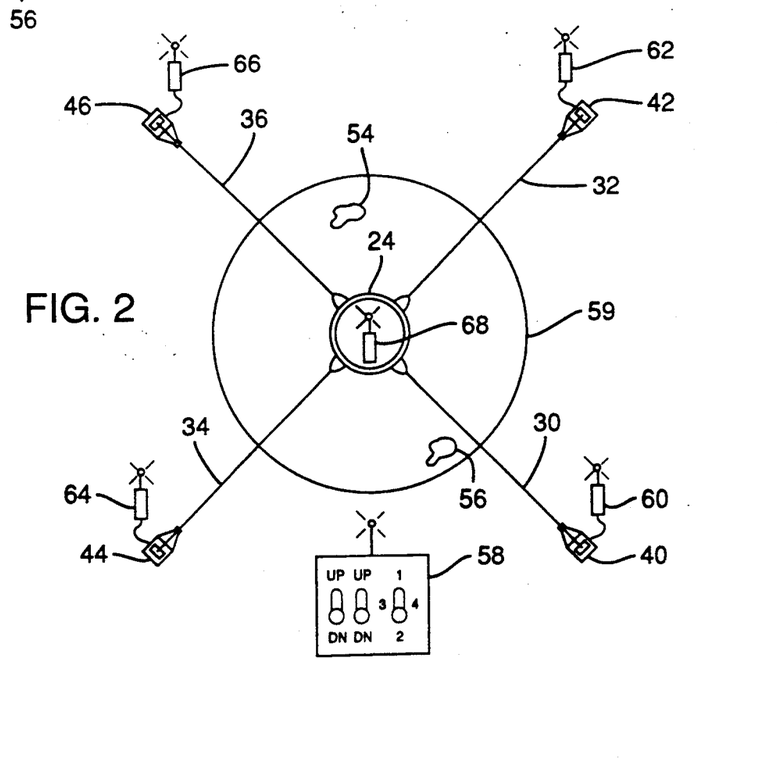
FIG. 2 is a simplified top view of a typical guy line attachment arrangement of the aerially transporting apparatus of the present invention with the aerostat removed for clarity.

In the embodiment of FIG. 2, the several guy line control apparatuses 40, 42, 44, and 46 are spaced about the periphery of a desired area over which logs or other high tonnage loads are to be moved and define the limits of such area. The aerostat has a range of travel anywhere within the circle 59 which includes, for example, a pickup site 54 and a discharge site 56. The operator control console 58 communicates with a plurality of receivers 60-66. A receiver is provided for each guy line control apparatus. For instance, receiver 60 receives the signals from operator control console 58 for controlling guy line control apparatus 40. Receiver 62, having a different frequency or coding, receives the signals from the operator control console 58 for controlling guy line control apparatus 42. Similarly, receiver 64 communicates with guy line control apparatus 44 and receiver 66 communicates with guy line control apparatus 46. In this embodiment of the invention, an additional receiver 68, is provided on the aerostat support platform 24 for raising and lowering lift line 50, as explained below.

Figure 3:
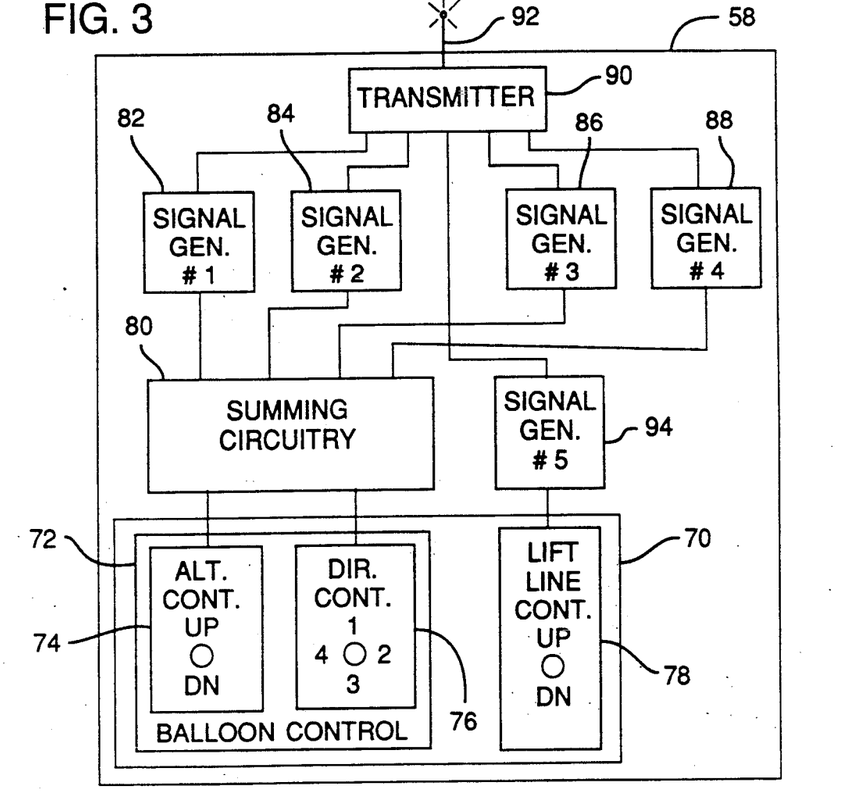
FIG. 3 is a block diagram of the operator's control console of the present invention.

Referring now to FIG. 3, the operator control console 58 has a switch panel 70 which includes a first switch grouping including a plurality of switches 72 for controlling the altitude and horizontal directional movement of the balloon. A three-position switch 74 controls the altitude of the balloon and has a neutral off position, an upward position, and a downward position. Another switch control 76, typically a "joy stick" type switch, controls the directional travel of the balloon. A second switch grouping 78 controls the lift line, allowing the lift line to be raised or lowered if the adjustable lift line is used.

Signals from switches 74 and 76 are fed to a summing circuit 80 which discriminates these switch signals in order to provide control codes to be sent to the various guy line control apparatuses. These control signals are discriminated and transmitted to a plurality of signal generators 82, 84, 86, and 88, each of which has a separate coding and each coding is transmitted to the appropriate receivers 60, 62, 64, and 66.

In one embodiment of the invention, each receiver may be tuned to a different frequency. The signal generators 82, 84, 86, and 88 then create a frequency signal which is transmitted. For instance, signal generator 82 has a transmitting frequency that is equivalent to the receiving frequency of receiver 60. Signal generator 84 is tuned to the same frequency as receiver 62, signal generator 86 is tuned to the same frequency as receiver 64 and signal generator 88 is tuned to the same frequency as receiver 66. The signal generators' output signals are fed to a transmitter 90 where the signals are transmitted by antenna 92 to the appropriate receivers. Similarly, the switch signals from switch 78 which controls the lift line are sent to an additional signal generator 94 which generates a signal which may be received by receiver 68. This output signal from the signal generator 94 is also fed to transmitter 90. Any resulting output signal is transmitted by antenna 92.

It will be understood by one skilled in the art that, alternatively, a single frequency may be used and the control signals coded on that single frequency.

Figure 4:
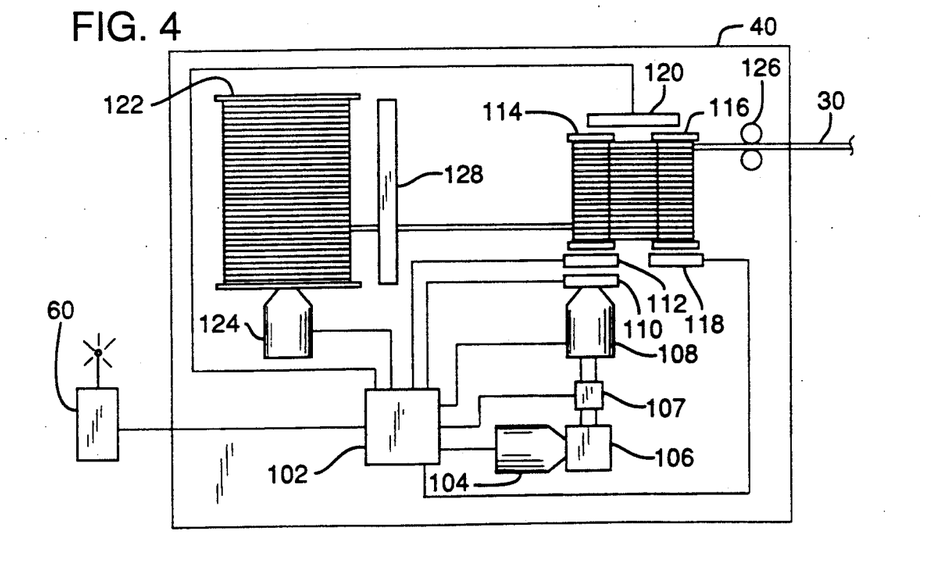
FIG. 4 is a diagrammatic view of a guy line control apparatus of the present invention.

Referring now to FIG. 4, the guy line control apparatus 40 receives a control signal from receiver 60 into controller 102. Controller 102 decodes the received signal and receives signals from other components within the guy line control apparatus 40, and sends signals to various other components. One of the signals is sent to an electric motor 104 which drives a hydraulic pump 106. Hydraulic pump 106 drives a reversible hydraulic motor 108 through a clutch 110 and a brake 112 to control the rotation of winch drum 114. Drum 114 works in conjunction with drum 116 to receive the guy line 30 which passes through fairleads 126. Suitable directional control valving 107, known in the art, is used to selectively reverse the flow of the hydraulic fluid through the pump-motor hydraulic circuit to reverse the direction of winch rotation.

A tension measuring member 120, preferably, a hydraulic cylinder with a pressure detector to detect the pressure within the cylinder, is used to detect tension in a tension member. In this case, the tension member comprises of drum 114 and drum 116. The guy line passes about each of these two drums for a number of turns. This isolates the tension in the guy line 30 from a line storage reel 122. This prevents subsequent layers of the guy line 30 from embedding themselves into layers previously wound on the line storage reel 122, thus, preventing heating and abrasion of the guy line 30. The line storage reel 122 is driven by a motor 124 to selectively retract or extend the guy line 30 onto or off of the storage reel 122. A level wind mechanism 128 is provided to evenly store the guy line 30 upon the line storage reel 122

The signal from tension measurement device 120 is fed to controller 102. Controller 102 automatically retracts or takes up guy line 30 when the tension falls below a first predetermined level. Should the tension device 120 detect a load which is excessively high, a signal is sent to warn the operator of potential failure of the guy line control apparatus. The controller 102 also sends signals to brake 112 and brake 118 in order to induce a load on winch drums 114 and 116 to again reduce any tension induced upon the line storage device 122.

Figure 5:
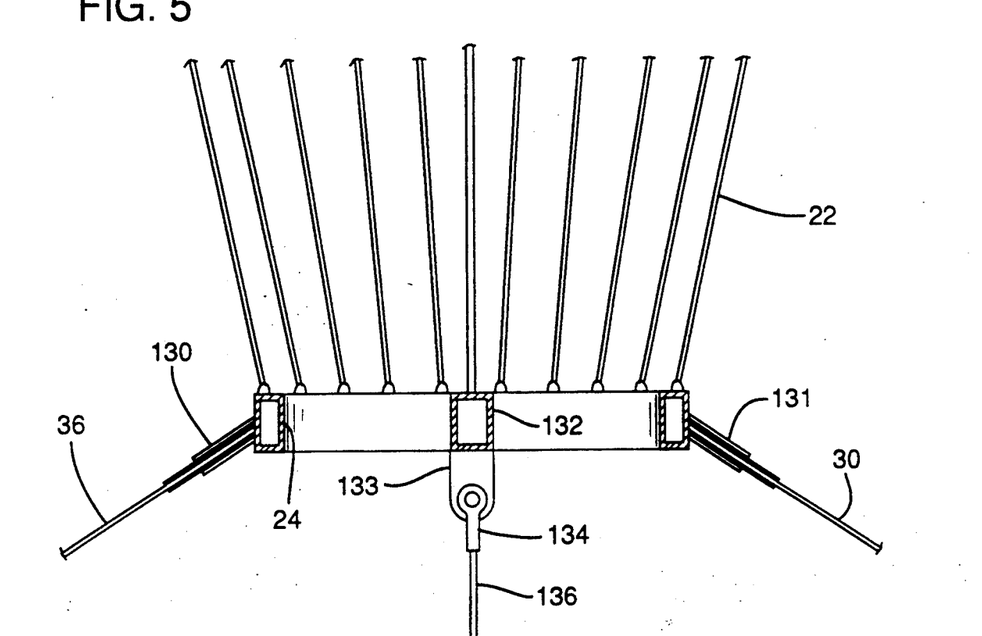
FIG. 5 is a partially broken away perspective view of an aerostat support platform of the present invention.

In the embodiment of the invention shown in FIG. 5, guy lines 30, 32, 34, and 36 have their respective first ends connected directly to support platform 24. Guy line 30 has its first end connected to platform 24 by connector 131 while guy line 36 has its first end connected to platform 24 by connector 130. A central support member 132 has a clevis member 133 attached beneath the center of support platform 24 for receiving a matching clevis 134 of a fixed length lift line 136.

Figure 6:
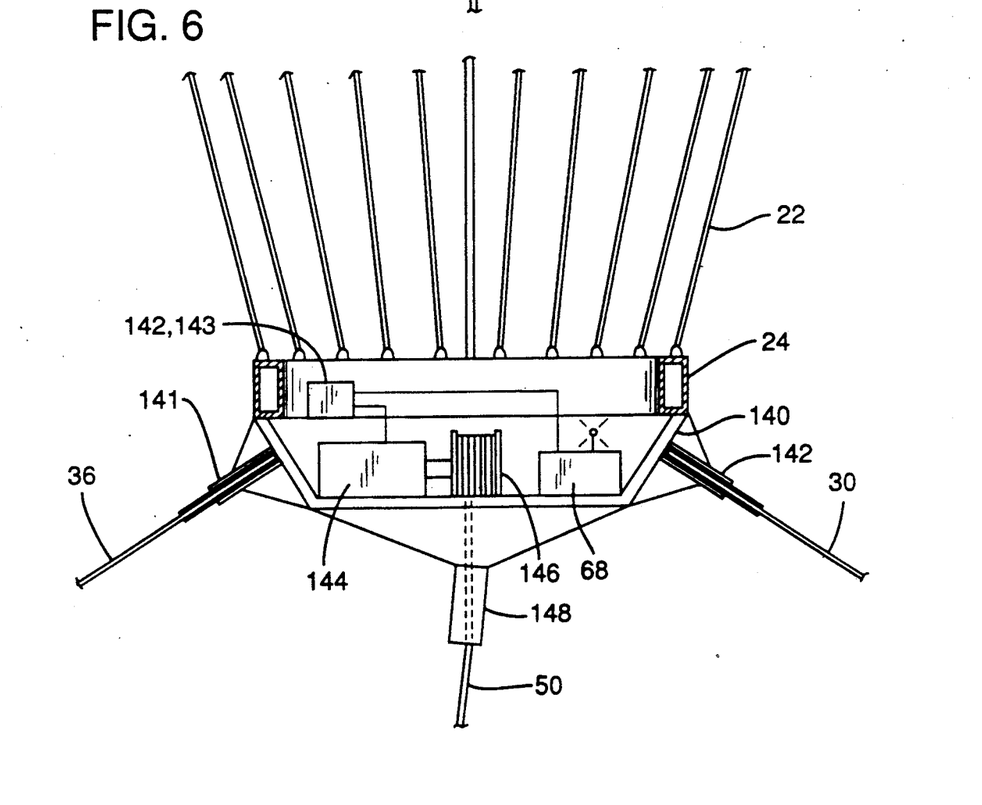
FIG. 6 is a partial broken away perspective view of an alternative aerostat support platform of the present invention.

In an alternative embodiment of the invention shown in FIG. 6, an equipment platform 140 is attached to support platform 24. The guy lines 30, 32, 34, and 36 are connected directly to the equipment platform 140. Guy line 30 has its first end connected to equipment platform 140 by connector 142 while guy line 36 has its first end connected to equipment platform 140 by a connector 141. A radio receiver 68 receives signals from the operator control console 58 and feeds the signals to a controller 143. The controller 143 controls a motor 144 which selectively rotates a winch drum 146 to extend or retract lift line 50 through fairlead 148. In this manner, the lift line may be retracted or extended using the equipment platform 140 as its reference.

Figure 7:
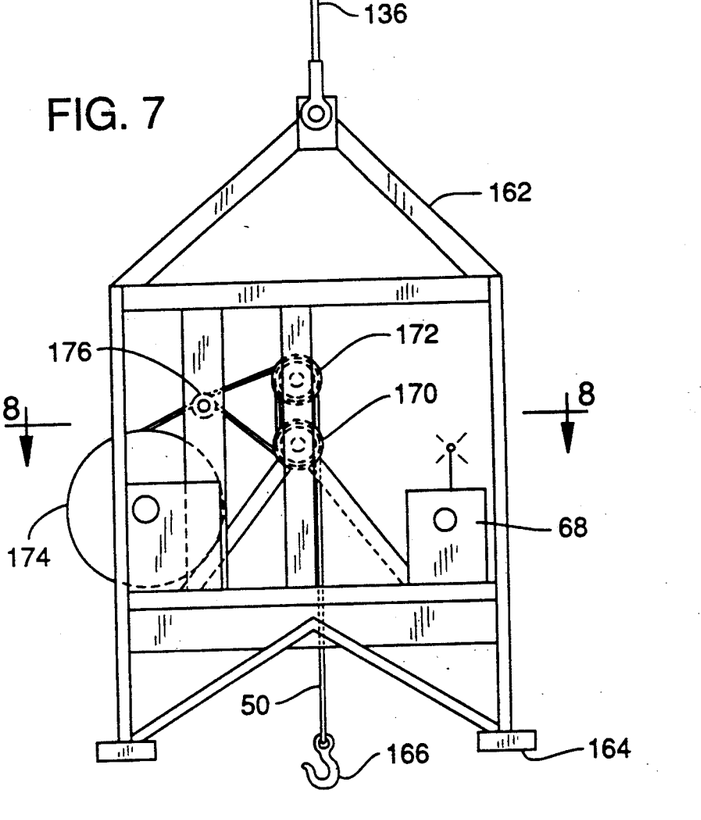
FIG. 7 is a side view of an equipment platform of the present invention.
Figure 8:
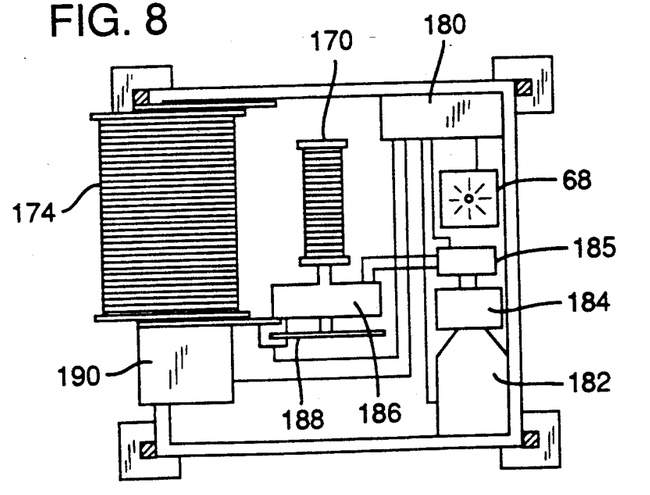
FIG. 8 is a top view along lines 8—8 of FIG. 7 of the equipment platform of the present invention.

In the embodiment of the invention shown in FIGS. 7 and 8, the lift line 50 has a control mechanism to allow the lift line to be raised or lowered from the equipment platform. An equipment platform 162 is suspended beneath the support platform 24 by an equipment platform support line 136. The equipment support platform 162 has a controller 180 which is in communication with the receiver 68. The controller 180 may be a microprocessor based controller with built-in memory which can control a prime mover 182, which may be an electric or gasoline-driven motor. The prime mover 182 drives a hydraulic pump 184 for supplying power to a reversible hydraulic motor 186. Suitable valving 185 is included to reverse the direction of hydraulic motor 186. Tension members comprising drum 170 driven by the hydraulic motor 186 and a drum 172 have the lift line 50 wound about them several times. This isolates any tension on lift line 50 from a line storage drum 174. A level wind mechanism 176 uniformly winds the unstressed lift line 50 on line storage drum 174.

In operation, receiver 68 sends a signal to controller 180. Controller 180 controls the prime mover 182 for hydraulic pump 184. Hydraulic pump 184 drives reversible hydraulic motor 186, which in turn drives winch drum 170. Rotation of drum 170 either pulls lift line 50 from storage drum 174 or feeds line 50 or onto drum 174, depending on the direction of rotation of winch drum 170. A brake 188 is connected to drum 172 and is controlled by controller 180. Brake 188 locks to prevent any slippage of the lift line 50 when winch drum 170 is not retracting or extending lift line. A storage reel take-up motor 190 is also under control of controller 180 and uniformly stores the lift line on the line storage reel 174.

Figure 9:
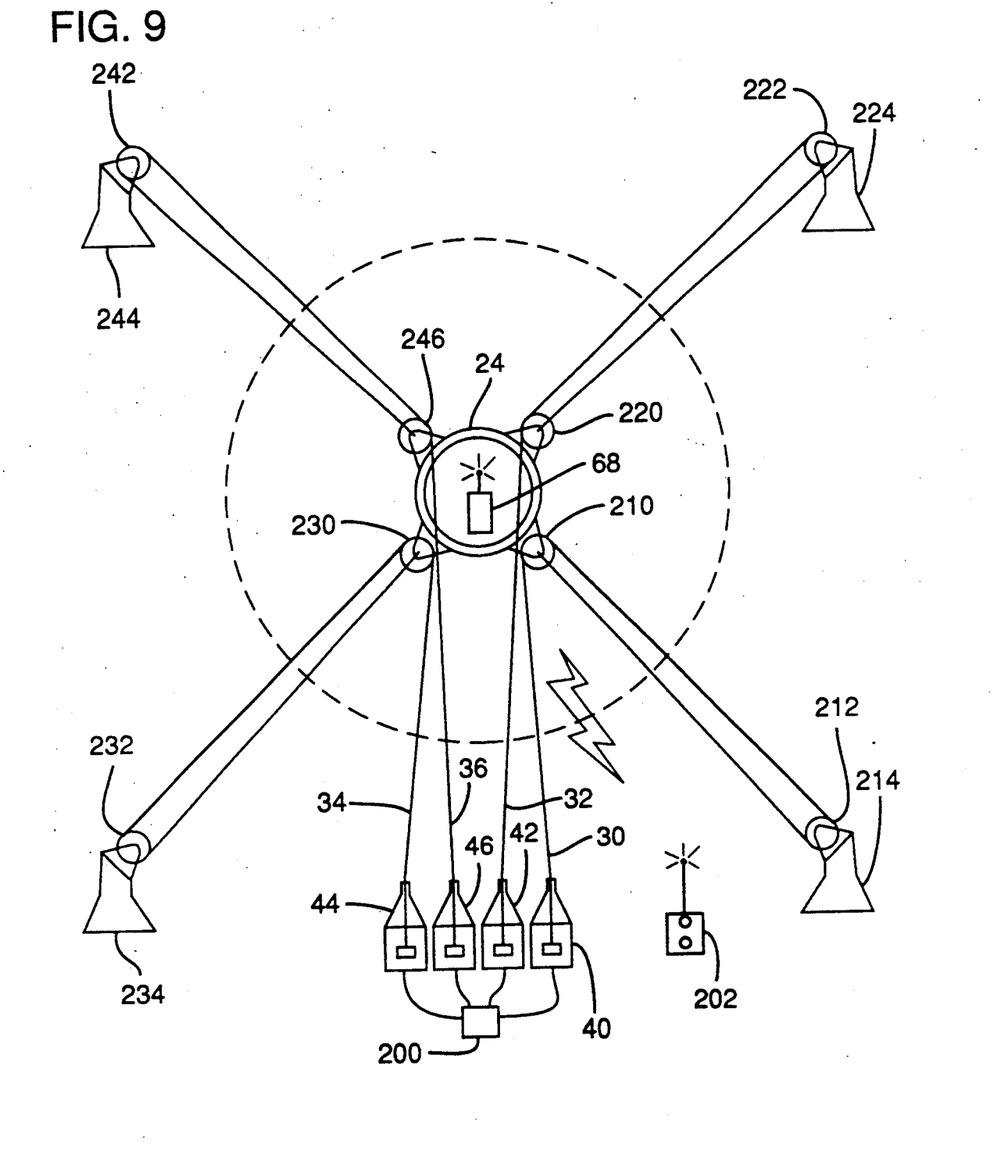
FIG. 9 is a simplified top view of an alternative guy line attachment arrangement of the aerial transport apparatus of the present invention with the aerostat removed for clarity.

All of the above description has been directed at a radio controlled system to control each guy line control apparatus. In the alternative embodiment of FIG. 9, it can be seen that all of the guy line control apparatuses 40, 42, 46, and 44 may be placed in one location and the operator control console 200 hard wired directly to each adjacent guy line control apparatus. This is accomplished by placing fairleads 210, 220, 230, and 240 directly on the support platform 24. Ground anchors 214, 224, 234, and 244 are placed about the logging area and fairleads are attached to each ground anchor. Fairlead 212 is attached to ground anchor 214. Fairlead 222 is connected to ground anchor 224. Fairlead 232 is connected to ground anchor 234, and fairlead 242 is connected to ground anchor 244. In this manner, the first end of a guy line 30 is attached to the support platform 24, progresses downward toward ground anchor 214 through fairlead 212, back up to support platform 24 about fairlead 210, and then down to guy line control apparatus 40. The remainder of the guy lines 32, 34, and 36 are strung in a similar manner through their respective fairleads. An individual operator's handset 202 may be used to communicate with the variable length lift line control means through receiver 68 on the support platform.

Figure 10:
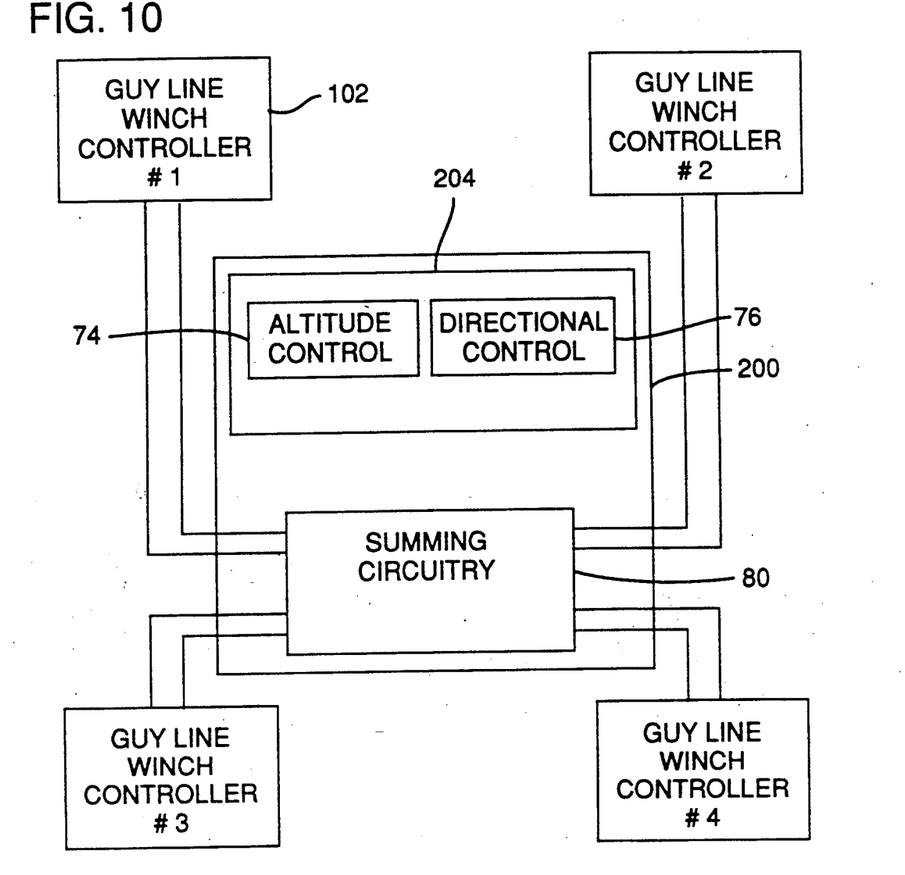
FIG. 10 is a block diagram of the operator's console for use with the alternate guy line attachment arrangement as shown in FIG. 9.

The operator control console 200 can be seen in further detail in FIG. 10. In this embodiment, no radio receiver or transmitters are required. The altitude control switch 74 and the directional control switch 76 are the same as in the previous embodiment and are on a switch panel 204. The signals from each of these control switches is fed to a summing circuit 80 as was previously mentioned. Rather than being fed to a frequency or coding controller and a transmitter, however, these signals are transmitted by wires directly to each one of the guy line winch controllers 102.

Figure 11:
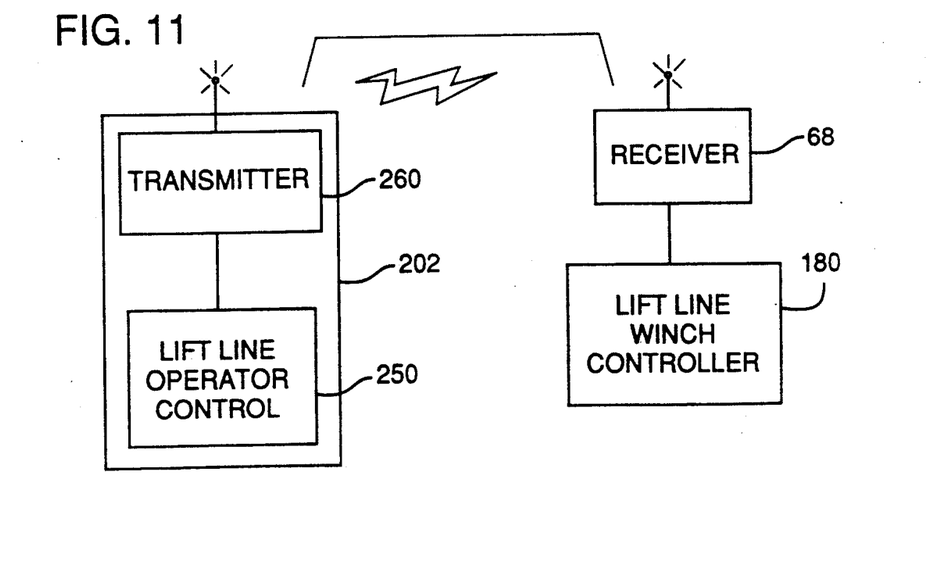
FIG. 11 is a block diagram of a lift line controller of the present invention.

In either of the embodiments described above where the lift line is extensible and retractable, a hand-held operator's transmitter 202 may be used to control extension and retraction. The lift line operator's control may be a simple up/down switch which generates a signal fed to a radio transmitter 260. The radio receiver 68, on either the equipment platform 160 or the support platform 140, then is used to control the controller 180.

Figure 12:
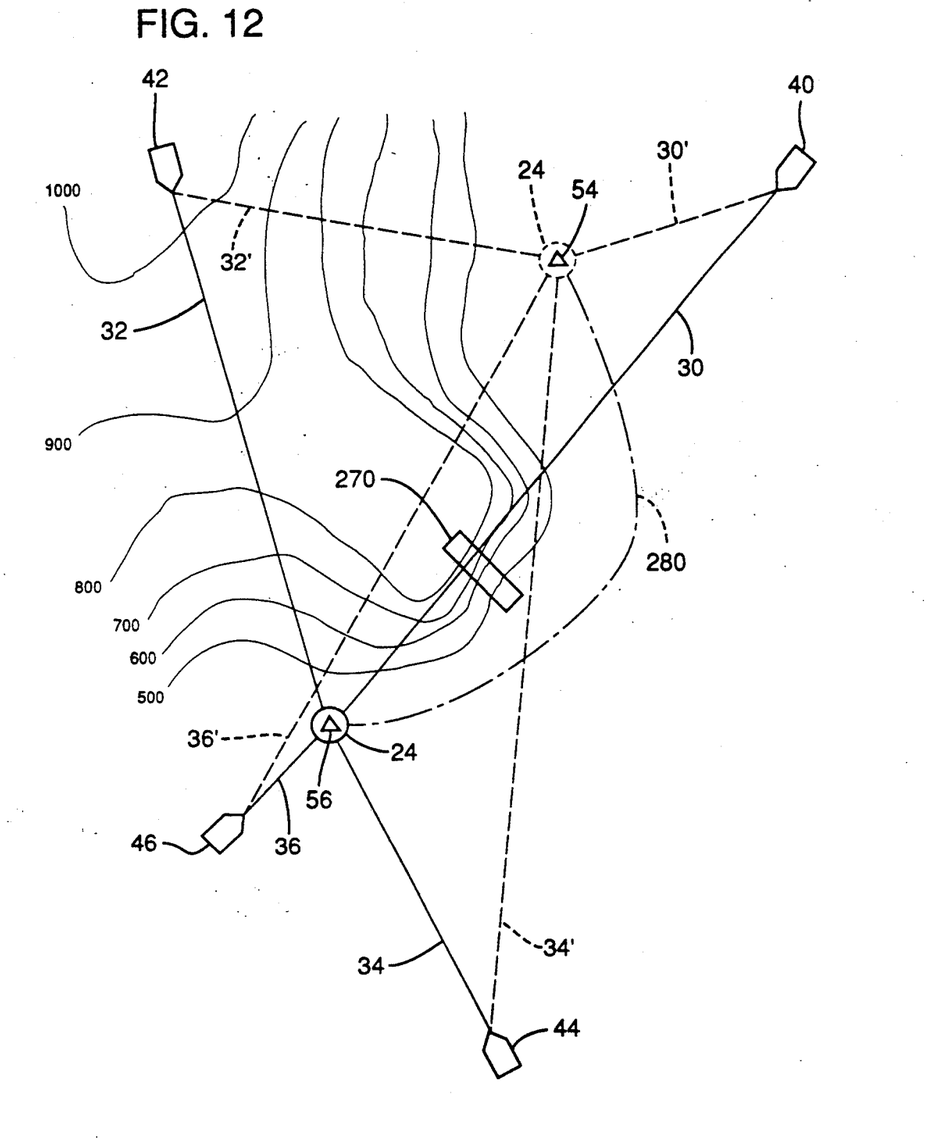
FIG. 12 is a topographic map showing the aerial transporting apparatus of the present invention transporting a load from a loading site to a discharge site by maneuvering around an obstruction.

This invention is particularly useful in obstructed terrain, such as the rugged terrain represented by the topographic map of FIG. 12, showing a typical logging site having a maximum elevation of 1,000 feet above sea level. As can be seen, outlined section 270 is a near-vertical cliff descending from 800 feet to 500 feet in elevation. In conventional balloon logging, a load may be picked up from a low-level loading site 54 for transportation to a low-level discharge site 56 in a straight line (as viewed in a horizontal plane) by first elevating the load high enough to clear the intervening cliff section 270. This particular invention, however, does not require that the aerostat lift the load above the 800 foot cliff level. Instead, the load can be transported entirely in the valley by following a horizontally curved flight path designated 280. The unique features of this invention which allow the aerostat full control of a load transport path in both horizontal and vertical directions allows the load to be lifted from the loading site 54 and traversed about the cliff section 270 without having to raise the load above the cliff for discharge at the discharge site 56. The described horizontal and vertical multi-directional load transport capabilities of the present invention also make it ideal for use in transporting loads in other environments where there are obstacles between load pick-up and load discharge points. Such environments include construction or storage sites in high-density industrial commercial or residential areas.

Although the presently preferred but not exclusive embodiment of the invention has been heretofore described, many modifications and variations thereof, both in structure and operation, or equivalent in characteristics, may occur to persons skilled in the art without departing from the spirit and scope of the present invention. It is understood that all such modifications, variations, and equivalents are encompassed by the present invention, as defined by the appended claims.

I claim:

1. An apparatus for aerially transporting a load between a ground-level loading site and a ground-level discharge site comprising when in use to transport a load:
   an aerostat;
   a load support means attached to said aerostat for aerial movement therewith;
   at least three guy lines attached to and radiating downwardly from said load support means to widely spaced-apart anchor points at ground level, the anchor points defining the corners of a polygonal working area, each guy line being suspended above ground level between the anchor points and the load support means such that the guy lines do not drag on the ground;
   a guy line control means at ground level attached to each of said guy lines and operable to tether said aerostat and to selectively retract and extend said guy lines independently of one another to cause said aerostat to move vertically and horizontally in multiple flight paths; and
   attachment means carried by said aerostat for engaging and disengaging a load whereby said load can be transported aerially by said aerostat between a load pickup point and a load discharge point in a desired flight path by controllably hauling in and hauling out on said guy lines.

2. An apparatus according to claim 1 wherein said load support means includes a support platform suspended beneath the aerostat.

3. An apparatus according to claim 2 wherein said attachment means comprises a load lift line attached to said support platform.

4. An apparatus according to claim 1 wherein said load support means includes a support platform suspended beneath the aerostat and an equipment platform suspended beneath the load support platform.

5. An apparatus according to claim 4 wherein said attachment means comprises a load lift line attached to said equipment platform.

6. An apparatus according to claim 1 wherein said attachment means comprises a fixed-length load lift line.

7. An apparatus according to claim 1 wherein said attachment means comprises a variable length load lift line.

8. An apparatus according to claim 7 including load lift line takeup and storage means on said load support means operable to vary the effective length of said line.

9. An apparatus according to claim 8 including ground-level load lift line length control means operable to control the operation of said takeup and storage means.

10. An apparatus according to claim 9 wherein said load lift line length control means includes ground-level radio signal transmitter means and radio signal receiver means on said load support means.

11. An apparatus according to claim 1 wherein each guy line control means includes guy line tension control means for controlling the tension in a connected guy line and hereby inhibiting excessive slack or tension in the connected guy line.

12. An apparatus according to claim 1 including common control means for coordinating the operation of the several guy line control means and thereby controlling the altitude and direction of travel of the aerostat and its connected load.

13. An apparatus according to claim 12 wherein said common control means includes first switch means for controlling the altitude of said aerostat, second switch means for controlling the horizontal direction of movement of the aerostat, signal generator means for generating command signals representing commands responsive to movements of said first and second switch means, and signal transmission means for transmitting said signals from said common control means to the several guy line control means, each guy line control means including means responsive to said command signals for paying in and paying out its connected guy line.

14. An apparatus according to claim 13 wherein said signal transmission means is a radio signal transmitter associated with the common control means and a radio signal receiver associated with each guy line control means.

15. The apparatus of claim 1 wherein the guy lines are made from a material having a specific tensile strength which is equal to the material's tensile strength divided by the material's density and which is greater than $8 \times 10^6$ inches.

16. The apparatus of claim 15 wherein the guy line material is selected from a group comprising Kevlar ® and Spectra ®.

17. An apparatus for aerially transporting a load between a loading site and a discharge site comprising:
a lighter-than-air balloon;
a plurality of balloon support lines, each of said balloon support lines having a first end and a second end, said first end of each balloon support line attached to said balloon;
a support platform suspended beneath said balloon and attached to the second end of each balloon support line;
at least three guy lines radiating downward from said support platform to widely spaced-apart anchor points at ground level, the anchor points defining the corners of a polygonal working area, each of said guy lines being suspended above the ground between the anchor points and the support platform such that the guy lines do not drag on the ground, and the guy lines each having a first end and a second end, said first end of each guy line attached to said support platform;
a guy line control means attached to the second end of each of said guy lines for selectively retracting or extending each of said guy lines to position said balloon in a horizontal and a vertical position; and
a lifting line for engaging said load, said lifting line extending from said support platform.

18. An apparatus for aerially transporting a load between a loading site and a discharge site as recited in claim 17 wherein each of said guy line control means includes a tension member, a motor means for reversibly rotating said tension member for selectively extending or retracting said guy line, a control means for controlling said motor means, and a storage means for storing said guy line.

19. An apparatus for aerially transporting a load between a loading site and a discharge site as recited in claim 18 wherein said tension member includes a measurement means for determining the tension in said guy line, said measurement means communicating with said control means wherein said control means activates said motor means to retract said guy line when said measurement means determines that the tension in said guy line is below a predetermined level.

20. The apparatus of claim 17 wherein the guy lines are made from a material having a specific tensile strength which is equal to the material's tensile strength divided by the material's density and which is greater than $8 \times 10^6$ inches.

21. The apparatus of claim 20 wherein the guy line material is selected from a group comprising Kevlar ® and Spectra ®.

22. An apparatus for aerially transporting a load between a loading site and a discharge site comprising:
a lighter-than-air balloon;
at least three guy lines radiating downward from said balloon to widely spaced-apart anchor points at ground level, the anchor points defining the corners of a polygonal working area, and each of said guy lines having a first end and a second end suspended above the ground between the balloon and the anchor points such that the guy lines do not drag on the ground;
a connection means to connect the first end of each of said guy lines to said balloon;
at least three guy line control means for selectively extending or retracting each of said guy lines, each of said guy line control means attached to the second end of each of said guy lines and each of said guy line control means independently operated and separately powered;
a load engagement means supported from said balloon for engaging said load;
a power means for extending and retracting said load engagement means;
a first operator control means for communicating with and controlling each of said guy line control means to selectively position said balloon in a horizontal and a vertical position by selectively controlling each of said guy line control means to extend or retract each of said guy lines; and
a second operator control means for communicating with and controlling said power means to selectively extend or retract said load engagement means.

23. The apparatus of claim 22 wherein the guy lines are made from a material having a specific tensile strength which is equal to the material's tensile strength divided by the material's density and which is greater than $8 \times 10^6$ inches.

24. The apparatus of claim 23 wherein the guy line material is selected from a group comprising Kevlar ® and Spectra ®.

25. An apparatus for aerially transporting a load between a loading site and a discharge site comprising:
an aerostat to provide lifting force;
a support platform located beneath said aerostat;
a plurality of support lines for attaching said aerostat to said support platform;
a plurality of guy lines comprising at least three guy lines, each of said guy lines having a first end and a second end, said first end of each guy line attached to said support platform and each of said guy lines radiating downwardly from said support platform;
a plurality of guy line control means for selectively retracting or extending said guy lines, one guy line control means associated with each guy line and attached to the second end of each guy line, each of said plurality of guy line control means further comprising,
a guy line tension reaction member, said guy line tension reaction member including a measurement means for determining tension in the associated guy line,
a guy line winding means including a reversible motor and a capstan for selectively retracting or extending the associated guy line,
a guy line storage means for storing said guy line from said winding means, and
a motor control means for controlling said motor;
an equipment platform suspended from said support platform;

a lifting line having a first end and a second end, said first end extending beneath said equipment platform for engaging said load; and a lifting line control means mounted on said equipment platform for engaging the second end of said lifting line, said lifting line control means further comprising, a lifting line tension reaction member for receiving said lifting line, a lifting line winding means including a reversible motor and a capstan for selectively retracting and extending said lifting line, a lifting line storage means for storing said lifting line from said lifting line winding means, and a motor control means for controlling said motor.

26. The apparatus of claim 25 wherein the guy lines are made from a material having a specific tensile strength which is equal to the material's tensile strength divided by the material's density and which is greater than $8 \times 10^6$ inches.

27. The apparatus of claim 26 wherein the guy line material is selected from a group comprising Kevlar ® and Spectra ®.

28. A method of aerially transporting a load between a pickup point and a discharge point at ground level comprising the steps:

tethering an aerostat above a ground work area by at least three guy lines radiating downwardly from the aerostat and terminating at widely spaced-apart anchor points defining the perimeter of the work area;

suspending a load from the aerostat;

hauling in on at least one said guy line while hauling out on the remaining guy lines to move the aerostat and its suspended load in a desired flight path having a horizontal component while suspending the guy lines above the ground.

29. The method of claim 28 including giving the flight path a vertical component by hauling in said at least one guy line and hauling out the said remaining guy lines at different rates.

30. The method of claim 28 including picking up or discharging a load at ground level by lowering a load line from the aerostat.

31. The method of claim 30 including lowering the load line by lowering the aerostat by hauling in on a guy line.

32. The method of claim 30 including lowering the load line by extending the length of the load line from the suspended aerostat.

33. The apparatus of claim 28 wherein the guy lines are made from a material having a specific tensile strength which is equal to the material's tensile strength divided by the material's density and which is greater than $8 \times 10^6$ inches.

34. The apparatus of claim 33 wherein the guy line material is selected from a group comprising Kevlar ® and Spectra ®.

* * * * *